United States Patent
Baumann

(10) Patent No.: US 10,614,053 B2
(45) Date of Patent: Apr. 7, 2020

(54) STORING PROCESSOR STATES DURING NUCLEAR EVENTS

(71) Applicant: TEXAS INSTRUMENTS INCORPORATED, Dallas, TX (US)

(72) Inventor: Robert Christopher Baumann, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 196 days.

(21) Appl. No.: 15/835,385

(22) Filed: Dec. 7, 2017

(65) Prior Publication Data

US 2019/0179909 A1   Jun. 13, 2019

(51) Int. Cl.
| G06F 17/30 | (2006.01) |
| G06F 16/23 | (2019.01) |
| G21J 5/00  | (2006.01) |
| G06F 1/30  | (2006.01) |
| G06F 1/26  | (2006.01) |
| H02H 5/00  | (2006.01) |

(52) U.S. Cl.
CPC .......... G06F 16/2308 (2019.01); G06F 1/263 (2013.01); G06F 1/30 (2013.01); G21J 5/00 (2013.01); H02H 5/005 (2013.01)

(58) Field of Classification Search
CPC ........ G06F 16/2308; G06F 1/263; G06F 1/30; G21J 5/00
USPC ................................................... 707/600–899
See application file for complete search history.

(56) References Cited

U.S. PATENT DOCUMENTS 5,786,975 A * 7/1998 Duncan .................. H02H 5/005
                                                        250/505.1

* cited by examiner

Primary Examiner — Isaac M Woo
(74) Attorney, Agent, or Firm — John R. Pessetto; Charles A. Brill; Frank D. Cimino

(57) ABSTRACT

In some examples, a system comprises a nuclear event detector (NED) to issue a nuclear event status signal, a primary power supply to issue a power status signal, a backup power supply, a non-volatile storage, and a processor coupled to the non-volatile storage and the NED and switchably coupled to the primary and backup power supplies. The processor is to store a state of the processor to the non-volatile storage based on the nuclear event status signal, and the processor is to selectively receive power from either the primary power supply or the backup power supply based on the nuclear event status signal and the power status signal.

20 Claims, 4 Drawing Sheets

STORING PROCESSOR STATES DURING NUCLEAR EVENTS

BACKGROUND

Nuclear events—for instance, nuclear explosions—increase atmospheric radiation levels. Electronic devices that are located in areas of increased atmospheric radiation levels may be required to perform despite the increased radiation levels.

SUMMARY

In some examples, a system comprises a nuclear event detector (NED) to issue a nuclear event status signal, a primary power supply to issue a power status signal, a backup power supply, a non-volatile storage, and a processor coupled to the non-volatile storage and the NED and switchably coupled to the primary and backup power supplies. The processor is to store a state of the processor to the non-volatile storage based on the nuclear event status signal, and the processor is to selectively receive power from either the primary power supply or the backup power supply based on the nuclear event status signal and the power status signal.

In some examples, a system comprises a nuclear event detector (NED), a primary power supply, a backup power supply coupled to the primary power supply via a first switch, non-volatile storage, and a processor coupled to the non-volatile storage and the NED and switchably coupled to the primary and backup power supplies via a second switch. The system also comprises a first logic element having inputs coupled to the NED and the primary power supply and an output coupled to the first switch. The system comprises a second logic element having inputs coupled to the NED and the primary power supply and an output coupled to the second switch. The processor stores a system state to the non-volatile storage.

In some examples, a method comprises receiving a nuclear event status signal and a power status signal, the nuclear event status signal able to indicate a nuclear event and the power status signal able to indicate a power event. The method comprises, in response to the nuclear event status signal indicating a nuclear event and the power status signal not indicating a power event, storing a state of a processor to non-volatile storage, ceasing providing power from a primary power supply to the processor, and providing power from a backup power supply to the processor. The method comprises, in response to the power status signal indicating a power event and the nuclear event status signal not indicating a nuclear event, ceasing providing power from the primary power supply to the processor and instead providing power from the backup power supply to the processor. The method comprises, in response to the nuclear event status signal indicating a nuclear event and the power status signal indicating a power event, storing a state of the processor to non-volatile storage, ceasing providing power from the primary power supply to the processor, and providing power from the backup power supply to the processor.

BRIEF DESCRIPTION OF THE DRAWINGS

For a detailed description of various examples, reference will now be made to the accompanying drawings in which.

DETAILED DESCRIPTION

Figure 1:
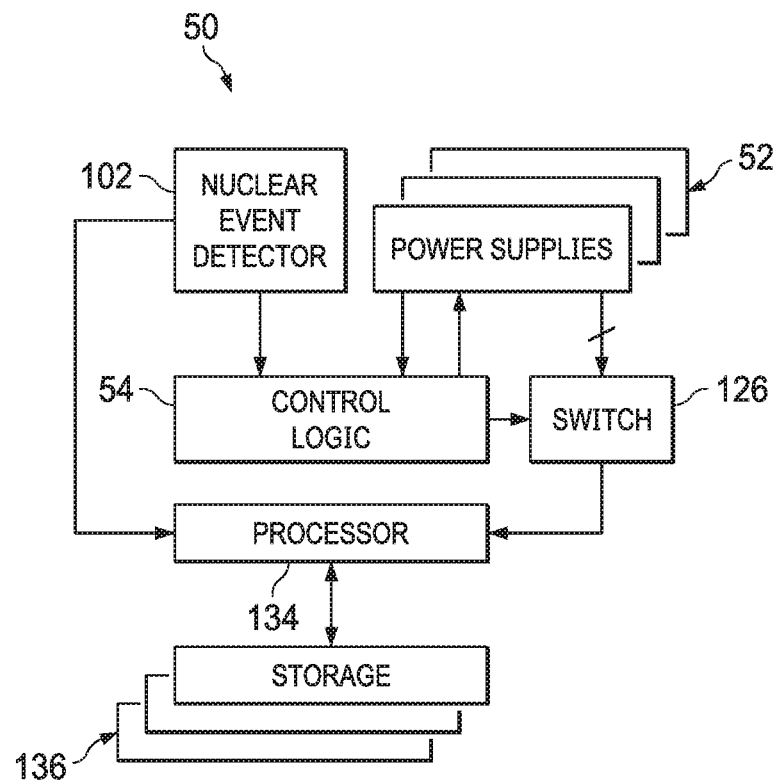
FIG. 1 depicts a block diagram of an illustrative electronic device in accordance with embodiments.

Immediately following a nuclear detonation, a large flux of gamma rays and a pulse of energetic neutrons are emitted and delivered at a high dose-rate to the surrounding atmosphere. Increased atmospheric radiation levels following a nuclear event cause electronic devices to operate erratically. For example, a processor within an electronic device in an area of increased radiation levels might shut down temporarily due to the effects of the increased radiation. When a processor re-boots in this manner, the processor loses its state—that is, it loses the values stored in volatile storage, such as processor registers, flip-flops, latches, etc.

Accordingly, disclosed herein are various embodiments of an electronic device that is configured to preserve processor state when increased atmospheric radiation levels are detected. (The term "processor," as used herein, broadly refers to any device or system configured to perform operations, including microcontrollers, digital signal processors, central processing units, application-specific integrated circuits, logic arrays, field-programmable gate array-implemented circuits, etc.). More specifically, the electronic device comprises a nuclear event detector (NED) to issue a nuclear event status signal, a primary power supply to issue a power status signal, a backup power supply, a non-volatile storage, and a processor coupled to the non-volatile storage and the NED and switchably coupled to the primary and backup power supplies. The processor is to store a state of the processor (or, more generally, a state of the electronic device) to the non-volatile storage based on the nuclear event status signal, and the processor is to receive power from the primary power supply or the backup power supply based on the nuclear event status signal and the power status signal. For example, if the nuclear event status signal indicates a nuclear event, the processor saves its state (e.g., register contents) to non-volatile storage before it is forced to shut down due to the increased atmospheric radiation levels.

In addition, the electronic device ceases providing power to the processor using the primary power supply, which might be failing due to radiation effects, and instead provides power to the processor using the backup power supply (e.g., a radiation-hardened power supply or a super-capacitor). By providing power from the backup power supply instead of the failing primary power supply, the processor is provided with more time to save its state. Furthermore, using the backup power supply instead of the failing primary power supply provides constant power to the processor so that the processor resumes normal operation as soon as it is able and so that it is not in a situation where it is ready to resume operation but cannot do so because it is waiting for the primary power supply to come back online. In this way, the failing primary power supply is removed as an operational bottleneck. The processor is brought back online when the nuclear event detection signal no longer indicates a nuclear event—i.e., when the signal no longer indicates atmospheric radiation levels exceeding a threshold. Use of the primary power supply resumes when the power status signal indicates that the primary power supply is again online and available for use. When the primary power supply resumes providing power to the processor, the primary power supply also resumes charging the backup power supply for use when the next nuclear event occurs.

FIG. 1 depicts a block diagram of an illustrative electronic device 50 in accordance with embodiments. The electronic device 50 includes a nuclear event detector (NED) 102; power supplies 52; control logic 54 (e.g., radiation-hardened, or "rad-hard," control logic); a processor 134; storage 136 that includes non-volatile storage and that optionally includes other types of storage; and a switch 126 (e.g., a transistor). The NED 102 couples to the control logic 54 and the processor 134; the power supplies 52 couple to the control logic 54 and the switch 126; the control logic 54 couples to the switch 126 in addition to the NED 102 and the power supplies 52; the switch 126 couples to the processor 134 in addition to the control logic 54 and the power supplies 52; and the storage 136 couples to the processor 134. The architecture depicted in FIG. 1 is illustrative and non-limiting. Other architectures are contemplated and included within the scope of this disclosure.

In operation, the NED 102 monitors the atmosphere in which the electronic device 50 is located to identify the occurrence of nuclear events, such as detonations. For example, the NED 102 monitors the radiation dose-rate in the atmosphere. When the parameter—such as radiation dose-rate—that the NED 102 monitors exceeds a threshold, the NED 102 issues a signal indicating the occurrence of a nuclear event. This signal is referred to herein as a nuclear event status signal and is provided to the control logic 54 and the processor 134.

The power supplies 52 include different types of power supplies. In some embodiments, for instance, the power supplies 52 include both a primary power supply and a backup power supply that is radiation-hardened, or "rad hard," such that it operates through a nuclear event without interruption. The primary power supply provides a power status signal to the control logic 54 indicating whether any problems are detected in the primary power supply. For example, the signal indicates if the voltage output of the primary power supply drops below a programmed threshold.

The control logic 54 comprises radiation-hardened components so that it operates through a nuclear event without interruption. Examples of the control logic 54 are provided below. The control logic 54 receives the nuclear event status signal and the power status signal from the NED 102 and a power supply 52, respectively. Based on the statuses of these signals, the control logic 54 causes the switch 126 to perform one or more actions. In addition, the nuclear event status signal that is provided to the processor 134 causes the processor 134 to perform one or more actions. Examples of these actions are now described.

The processor 134 comprises non-volatile logic (NVL) and is configured to store a state of the electronic device 50 (e.g., a state of the processor 134) to non-volatile storage in the storage 136 upon receipt of a triggering (e.g., LOW) signal from the NED 102. The processor 134 includes any suitable type of processor, such as microcontrollers, digital signal processors, central processing units, application-specific integrated circuits, logic arrays, and field-programmable gate array-implemented circuits. The state of the processor 134 includes, for instance, register, latch, and/or flip-flop values in the processor 134.

The switch 126 is configured to switchably couple the processor 134 to different ones of the power supplies 52. For example, if the switch 126 is in a first state, the processor 134 receives power from the primary power supply, and if the switch 126 is in a second state, the processor 134 receives power from the backup power supply. The state of the switch 126 is controlled by the control logic 54. A more detailed description of the components of the electronic device 50 is now provided with respect to FIG. 2A.

Figure 2B:
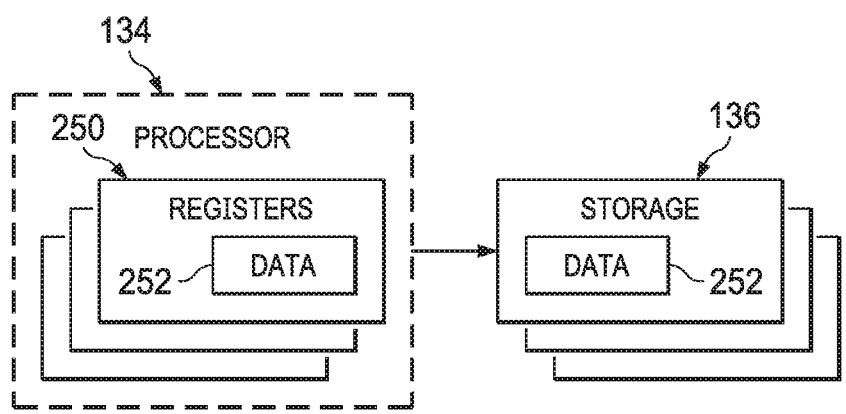
FIG. 2B depicts a block diagram of an illustrative state storage operation in accordance with embodiments.
Figure 2A:
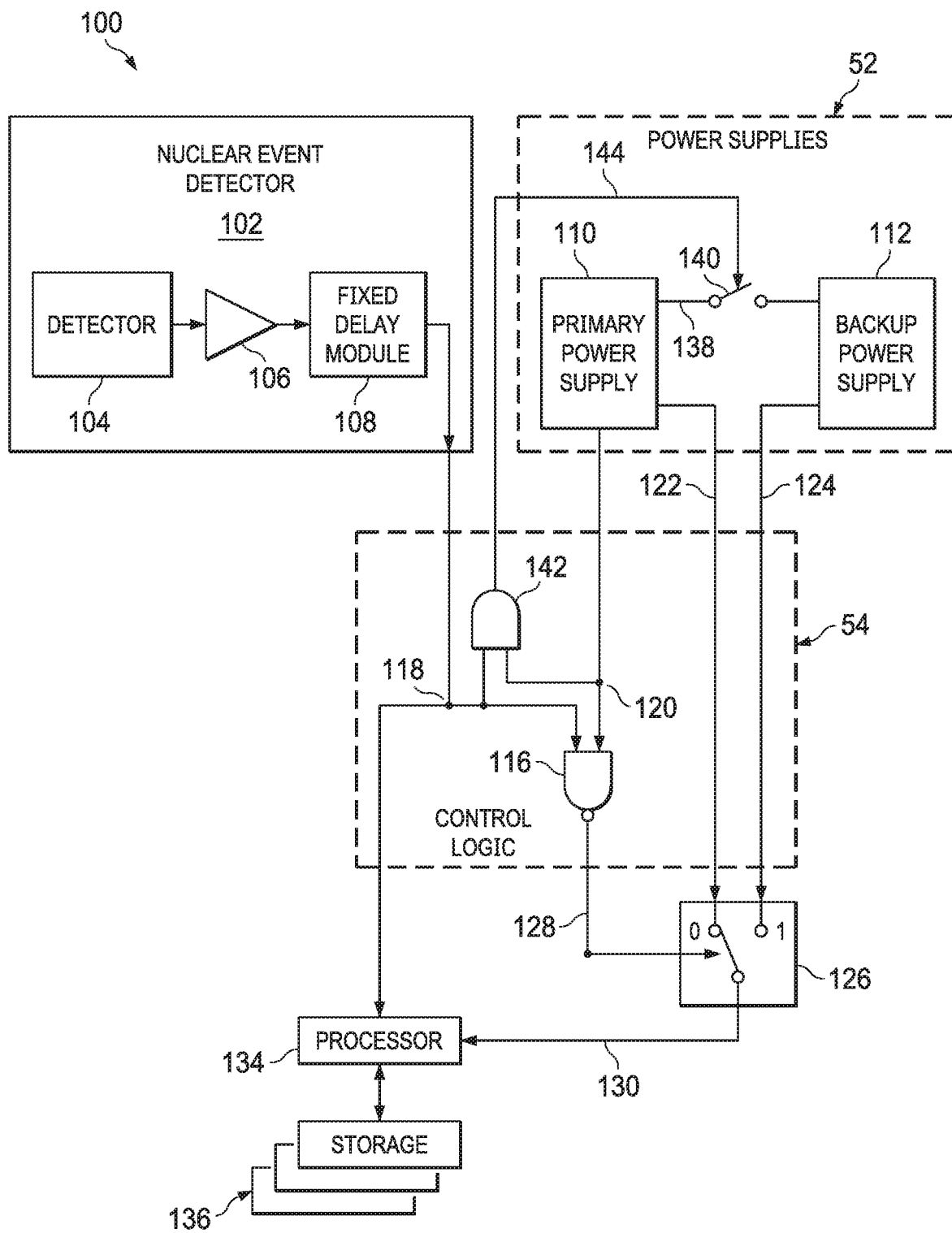
FIG. 2A depicts a block diagram of an illustrative electronic device in accordance with embodiments.

FIG. 2A depicts a block diagram of an illustrative electronic device 100 in accordance with embodiments. The electronic device 100 is numbered with the numeral "100" because it is an illustrative embodiment of the illustrative electronic device 50 and because other embodiments of the electronic device 50 besides that depicted in FIG. 2A are contemplated and fall within the scope of this disclosure. The electronic device 100 includes the NED 102; the power supplies 52; the control logic 54; the switch 126; the processor 134; and the storage 136. The NED 102 includes a detector 104, which detects nuclear events, an amplifier 106, which amplifies the output of the detector 104, and a pulse shaping and fixed delay module 108, which processes the amplifier output to produce a pulse with an appropriate phase. The output of the module 108 is provided at node 118, and this output is the nuclear event status signal, which is provided to the processor 134 and to the control logic 54. The power supplies 52 include the primary power supply 110 and the backup power supply 112. The primary power supply 110 is configured to couple to and charge the backup power supply 112 via switch 140. As previously explained, in some examples the backup power supply 112 is a radiation-hardened power supply that is capable of operating through a nuclear event. In some embodiments, the backup power supply 112 comprises a super capacitor and includes one or more capacitor banks. The primary power supply produces the power status signal at node 120, and this signal indicates the operational status of the primary power supply 110 (e.g., whether the output voltage of the primary power supply 110 has dipped below a threshold) and is provided to the control logic 54.

In some examples, the control logic 54 includes an AND gate 142 and a NAND gate 116. Both the AND gate 142 and the NAND gate 116 receive as inputs the nuclear event status signal, which the NED 102 produces at node 118, and the power status signal, which the primary power supply 110 produces at node 120. The AND gate 142 produces an output at 144, and this output controls the switch 140 that connects and disconnects the primary power supply 110 from the backup power supply 112. The NAND gate 116 receives the same inputs as the AND gate 142 and produces an output at 128. This output is provided to the switch 126. The specific architecture of the control logic 54 is merely illustrative. One of ordinary skill can apply the principles and techniques of this disclosure to develop various architectures that accomplish similar functions as the architecture shown in FIG. 2A, and all such variations are contemplated and included within the scope of this disclosure. In some examples, the control logic 54 includes rad-hard logic (e.g., latches, flip-flops) configured in a manner to implement the functionality described herein.

The switches 126 and 140 are, for instance, transistors. As shown, the switch 126 has at least two states: a first state in which the primary power supply 110 powers the processor 134, and a second state in which the backup power supply 112 powers the processor 134. The switch 140, in a first state, couples the primary power supply 110 to the backup power supply 112 so that the backup power supply 112 is charged using the primary power supply 110. In a second state of the switch 140, the two power supplies 110, 112 are disconnected. The operation of the electronic device 100 is described after an introduction to FIGS. 3 and 4, which include a timing diagram and a truth table, respectively, that are relevant to the operation of the electronic device 100.

FIG. 2B depicts an illustrative state storage operation. In particular, the processor 134 comprises multiple registers 250, with one or more of the registers 250 including data 252. The data 252, together with the registers 250, represents a state of the processor 134. Other storages besides registers 250 are contemplated, and other locations to store state besides processor 134 are contemplated. Upon saving state of the processor 134, the data 252 from the registers 250 is saved to non-volatile storage 136, as shown.

Figures 3, 4:
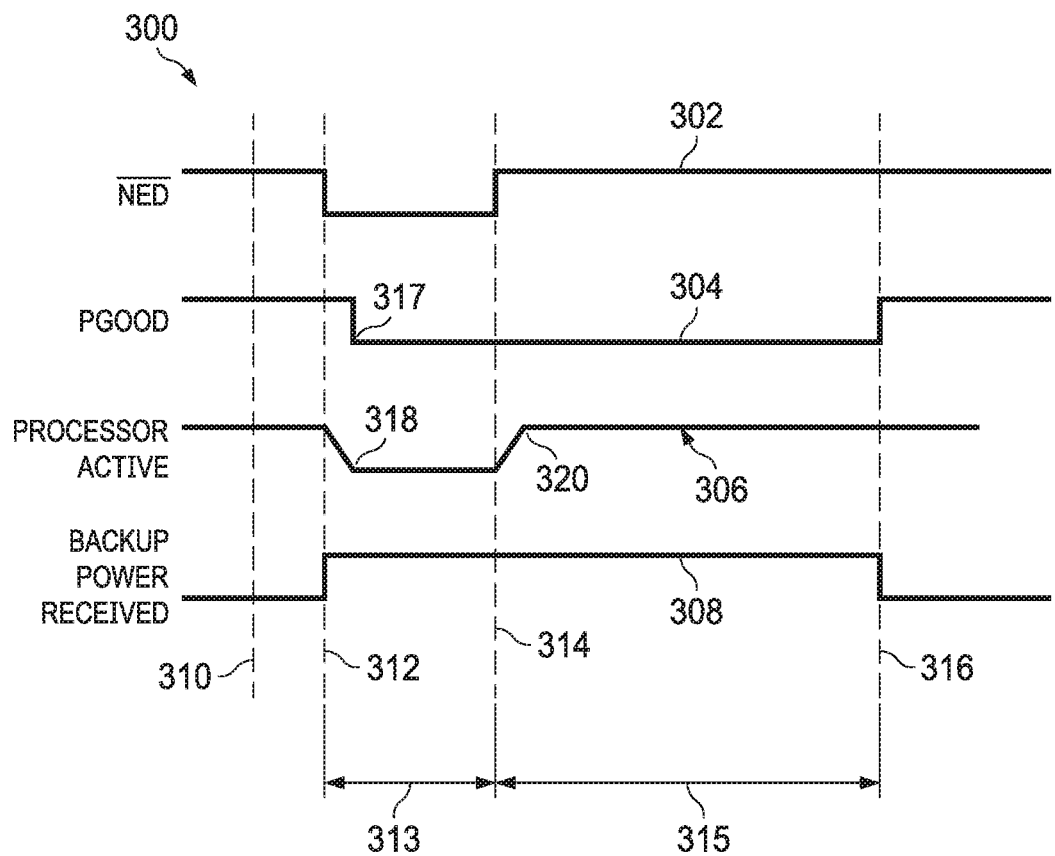
FIG. 3 depicts an illustrative timing diagram in accordance with embodiments.
FIG. 4 depicts an illustrative logic truth table in accordance with embodiments.

FIG. 3 depicts an illustrative timing diagram 300 in accordance with embodiments. The timing diagram 300 includes multiple curves 302, 304, 306, and 308. Curve 302 depicts the logic state of the nuclear event status signal produced by the NED 102. Curve 304 depicts the logic state of the power status signal produced by the primary power supply 110. Curve 306 indicates whether the processor 134 is active or inactive. Curve 308 indicates whether the backup power supply 112 is powering the processor 134. The x-axis of the timing diagram 300 indicates time. Numerals 310, 312, 314, 316, 317, 318, and 320 mark specific points in time, while numerals 313 and 315 mark specific periods of time.

FIG. 4 depicts an illustrative logic truth table 400 in accordance with embodiments. The table 400 includes four columns. The first column indicates a logic status of the nuclear event status signal. The second column indicates a logic status of the power status signal. The third column indicates a logic status of the output of the AND gate 142. The fourth column indicates a logic status of the output of the NAND gate 116. The first two columns indicate inputs to the AND and NAND gates, while the second two columns indicate the outputs of the AND and NAND gates. Thus, the values in the second two columns are functions of the values in the first two columns. The table 400 includes rows 402, 404, 406, and 408, which indicate the different permutations of the logic values for the nuclear event status signal and the power status signal.

The operation of the electronic device 100 is now described with simultaneous reference to FIGS. 2-4. At time 310, curve 302 is HIGH, indicating that no nuclear event is detected; curve 304 is HIGH, indicating that primary power supply 110 is operating properly; curve 306 is HIGH, indicating that the processor 134 is active; and curve 308 is LOW, indicating that the backup power supply 112 is not presently supplying power to the processor 134. Row 408 of the truth table 400 indicates that, in this state at time 310, the output of the AND gate 142 is HIGH and the output of the NAND gate 116 is LOW. As a result, the switch 140 receives a HIGH signal and is closed, thus enabling the primary power supply 110 to charge the backup power supply 112, and the switch 126 receives a LOW signal at 128 and thus maintains a connection between the primary power supply 110 and the processor 134. In this state, the primary power supply 110 powers the processor 134 and charges the backup power supply 112.

As curve 302 indicates, at time 312, a nuclear event is detected by the NED 102. As a result, the curve 302 goes LOW. At time 312, the primary power supply 110 is not yet affected by the radiation, and so the power status signal as depicted by curve 304 remains HIGH. As row 404 of truth table 400 indicates, curve 302 being LOW and curve 304 being HIGH results in the output of the AND gate 142 being LOW and the output of the NAND gate 116 being HIGH. A LOW AND gate output causes the switch 140 to disconnect the power supplies 110, 112, and a HIGH NAND gate output causes the switch 126 to disconnect the primary power supply 110 from the processor 134 and to connect the backup power supply 112 to the processor 134. Accordingly, as curve 308 in FIG. 3 indicates, the backup power supply begins supplying power at time 312. In addition, at time 312, the LOW nuclear event status signal causes the processor 134 (FIG. 2A) to save its state (e.g., register, flip-flop values) to non-volatile storage 136 in preparation for shutdown due to post-nuclear event radiation, and as curve 306 indicates, the processor 134 begins to shut down at time 312. Between time 312 and the time marked by numeral 318, the processor 134 saves its state to the non-volatile storage in storage 136 as described above. The backup power supply 112 should be providing power soon enough and long enough for the processor 134 to save state. At time 317, both the nuclear event status signal and the power status signal are LOW, and, as row 402 of the truth table 400 indicates, the output of the AND gate 142 is LOW and the output of the NAND gate 116 is HIGH. Thus, the power supplies 110, 112 remain disconnected, and the backup power supply 112 continues to supply the processor 134.

As curve 302 indicates, the radiation emitted by the nuclear event is significant enough to keep the NED 102 emitting a LOW nuclear event status signal during time period 313. At time 314, the radiation levels abate sufficiently to permit the nuclear event status signal to go HIGH (curve 302). As curve 304 indicates at time 314, however, the power status signal stays LOW because the primary power supply 110 takes a substantial length of time to resume normal operation. Nevertheless, because the backup power supply 112 is still providing power to the processor 134 (curve 308), and because the nuclear event status signal provided to the processor 134 is now HIGH, the processor is able to begin restarting when curve 302 goes HIGH at time 314 (curve 306). At time 320, the processor 134 is fully online. In some embodiments, the processor 134 retrieves the stored state from the non-volatile storage and applies it to the processor 134 at or around time 314. In some embodiments, the processor 134 retrieves the stored state from the non-volatile storage and applies it to the processor 134 at or around time 320. Row 406 of the truth table 400 indicates maintenance of the backup power supply connection to the processor 134 and continued disconnection between the power supplies 110, 112.

This state of operation continues during time period 315. At time 316, the primary power supply 110 resumes normal operation, as curve 304 indicates. As row 408 of the truth table 400 indicates, the output of the AND gate 142 is HIGH and the output of the NAND gate 116 is LOW. At this time, the processor 134 continues operating normally, the switch 126 connects the primary power supply 110 to the processor 134 and disconnects the backup power supply 112 from the processor 134, and the power supplies 110, 112 are again connected. In this way, the primary power supply 110 again powers the processor 134 and charges the backup power supply 112.

Figure 5:
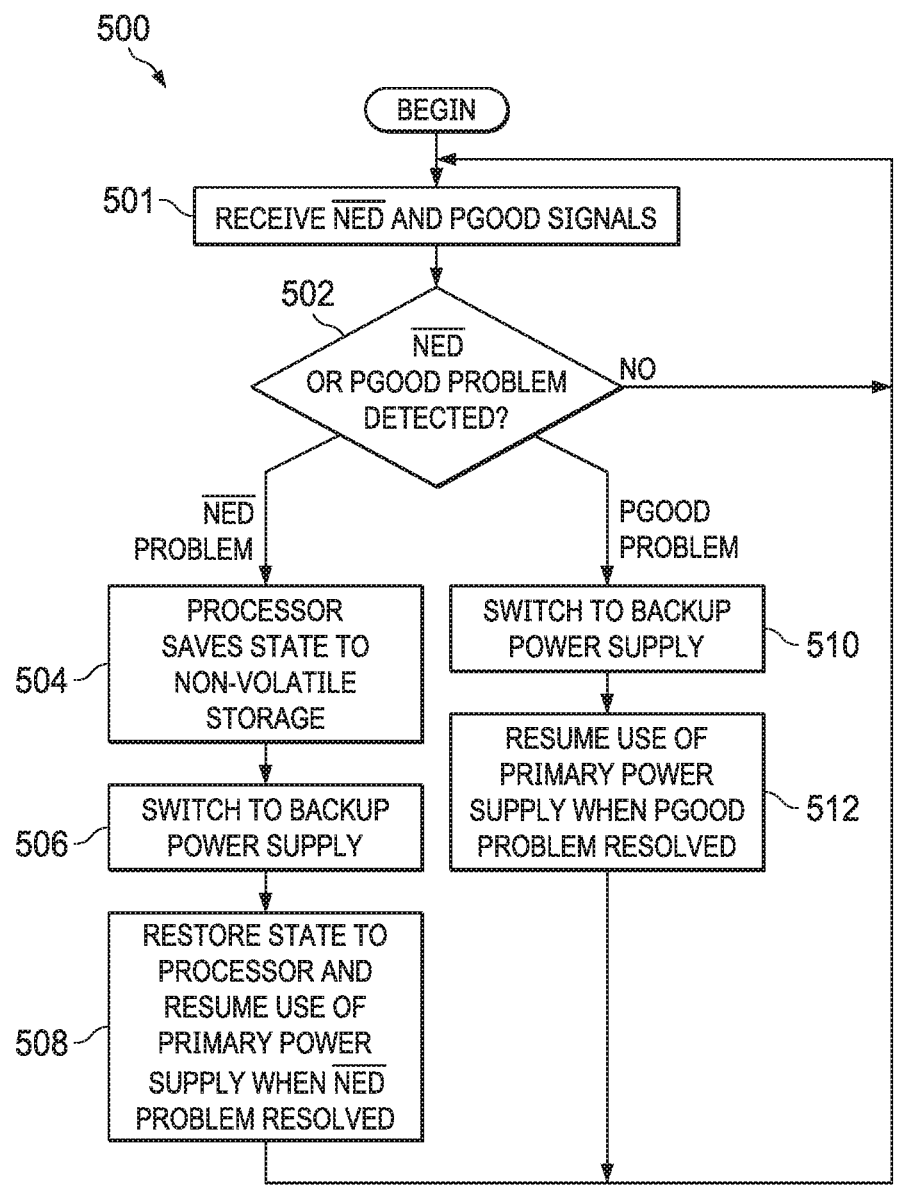
FIG. 5 depicts an illustrative flow diagram of a method in accordance with embodiments.

FIG. 5 depicts an illustrative flow diagram of a method 500 in accordance with embodiments. The method 500 begins with receiving a nuclear event status signal and a power status signal (step 501) and determining whether a problematic nuclear event status signal or power status signal is detected (step 502). If a problem is detected with the nuclear event status signal, the method 500 comprises the processor saving state to non-volatile storage (step 504), switching from the primary power supply to the backup power supply (step 506), and restoring state to the processor and resuming use of the primary power supply when the nuclear event status signal problem is resolved (step 508). In the event the problem is with the power status signal, the method 500 comprises switching from the primary power supply to the backup power supply (step 510) and resuming use of the primary power supply when the power status signal problem is resolved (step 512). After steps 508 and 512, flow of the method 500 returns to step 501. If no problem is detected at step 502, step 501 is performed again. In the event that both a nuclear event status signal and a power status signal are problematic, the steps 504, 506, 508, 510, and 512 are performed. The method 500 can be modified as desired, including by adding, deleting, modifying, and/or rearranging one or more steps.

In some embodiments, the processor 134 is programmed to react differently to the nuclear event status signal than described above. In some examples, the processor 134 is programmed to save its state to non-volatile storage periodically during normal operation (i.e., when the nuclear event status signal is HIGH). If and when the nuclear event status signal goes LOW, the processor 134 refrains from saving its state to non-volatile storage and allows itself to shut down and re-boot. When the processor 134 comes back online after the nuclear event status signal indicates that dangerous radiation levels have abated (e.g., at time 314 in FIG. 3), the processor 134 obtains the most recently stored state (which was stored to non-volatile storage prior to the nuclear event status signal going LOW) from the non-volatile storage and applies that state to the processor 134.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection is through a direct connection or through an indirect connection via other devices and connections. Similarly, a device that is coupled between a first component or location and a second component or location is through a direct connection or through an indirect connection via other devices and connections. An element or feature that is "configured to" perform a task or function is configured (e.g., programmed or structurally designed) at a time of manufacturing by a manufacturer to perform the function and/or is configurable (or re-configurable) by a user after manufacturing to perform the function and/or other additional or alternative functions. The configuring is through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

What is claimed is:

1. A system comprising:
   a nuclear event detector (NED) to issue a nuclear event status signal;
   a primary power supply to issue a power status signal;
   a backup power supply;
   a non-volatile storage; and
   a processor coupled to the non-volatile storage and the NED and switchably coupled to the primary and backup power supplies, the processor to store a state of the processor to the non-volatile storage based on the nuclear event status signal, and the processor to selectively receive power from either the primary power supply or the backup power supply based on the nuclear event status signal and the power status signal.

2. The system of claim 1 further comprising an AND gate having inputs coupled to the NED and the primary power supply and an output to control a switch, the switch to switchably couple the primary and backup power supplies to each other.

3. The system of claim 1 further comprising a NAND gate having inputs coupled to the NED and the primary power supply and an output to control a switch, the switch to switchably couple the primary and backup power supplies to the processor.

4. The system of claim 1, wherein the processor, in response to a state of the nuclear event status signal, retrieves the state of the processor from the non-volatile storage.

5. The system of claim 4, wherein the state of the processor is stored in a plurality of registers in the processor.

6. The system of claim 1, wherein the processor, in response to a state of the power status signal, resumes receiving power from the primary power supply and to discontinue receiving power from the backup power supply.

7. The system of claim 1, wherein the backup power supply comprises a radiation-hardened power supply.

8. A system comprising:
   a nuclear event detector (NED);
   a primary power supply;
   a backup power supply coupled to the primary power supply via a first switch;
   non-volatile storage;
   a processor coupled to the non-volatile storage and the NED and switchably coupled to the primary and backup power supplies via a second switch;
   a first logic element having inputs coupled to the NED and the primary power supply and an output coupled to the first switch; and
   a second logic element having inputs coupled to the NED and the primary power supply and an output coupled to the second switch,
   wherein the processor stores a system state to the non-volatile storage.

9. The system of claim 8, wherein the processor repeatedly stores the system state to the non-volatile storage in response to a nuclear event status signal from the NED not indicating a nuclear event.

10. The system of claim 8 wherein the backup power supply is selected from the group consisting of a super capacitor and a radiation-hardened power supply.

11. The system of claim 8, wherein the first logic element is an AND gate and the second logic element is a NAND gate.

12. A method comprising:
   receiving a nuclear event status signal and a power status signal, the nuclear event status signal able to indicate a nuclear event and the power status signal able to indicate a power event;
   in response to the nuclear event status signal indicating a nuclear event and the power status signal not indicating a power event, storing a state of a processor to non-volatile storage, ceasing providing power from a primary power supply to the processor, and providing power from a backup power supply to the processor;

in response to the power status signal indicating a power event and the nuclear event status signal not indicating a nuclear event, ceasing providing power from the primary power supply to the processor and instead providing power from the backup power supply to the processor;

in response to the nuclear event status signal indicating a nuclear event and the power status signal indicating a power event, storing a state of the processor to non-volatile storage, ceasing providing power from the primary power supply to the processor, and providing power from the backup power supply to the processor.

13. The method of claim 12 further comprising using an AND gate in tandem with the nuclear event status signal and the power status signal to connect and disconnect the primary and backup power supplies from each other.

14. The method of claim 12 further comprising resuming provision of power from the primary power supply to the processor in response to the power status signal no longer indicating the power event.

15. The method of claim 12, wherein the power event is the nuclear event.

16. The method of claim 12, further comprising using a NAND gate in tandem with the nuclear event status signal and the power status signal to control which of the primary and backup power supplies provides power to the processor.

17. The method of claim 12 further comprising resuming processor operation in response to the nuclear event status signal no longer indicating the nuclear event.

18. The method of claim 17, further comprising copying the state of the processor from the non-volatile storage to the processor in response to the nuclear event status signal no longer indicating the nuclear event.

19. The method of claim 12, wherein storing the state of the processor to the non-volatile storage comprises storing values of one or more registers of the processor to the non-volatile storage.

20. The method of claim 12, wherein the backup power supply is selected from the group consisting of a super capacitor and a radiation-hardened power supply.

\* \* \* \* \*